(12) United States Patent
Logvinov et al.

(10) Patent No.: US 12,145,455 B2
(45) Date of Patent: Nov. 19, 2024

(54) METHOD AND APPARATUS FOR CHARGING A BATTERY FROM AN ISOLATABLE ELECTRIC POWER GRID

(71) Applicant: IoTecha Corp., Cranbury, NJ (US)

(72) Inventors: Oleg Logvinov, Weston, CT (US); Gadi Lenz, Zikhron Ya'aqov (IL)

(73) Assignee: IoTecha Corp., Piscataway, NJ (US)

( * ) Notice: Subject to any disclaimer, the term of this patent is extended or adjusted under 35 U.S.C. 154(b) by 0 days.

(21) Appl. No.: 18/356,581

(22) Filed: Jul. 21, 2023

(65) Prior Publication Data

US 2023/0356605 A1 Nov. 9, 2023

Related U.S. Application Data

(63) Continuation of application No. 16/487,638, filed as application No. PCT/US2018/019175 on Feb. 22, 2018, now abandoned.

(Continued)

(51) Int. Cl.
| | |
|---|---|
| *B60L 50/60* | (2019.01) |
| *B60L 53/30* | (2019.01) |
| *B60L 53/50* | (2019.01) |
| *B60L 53/62* | (2019.01) |
| *B60L 53/63* | (2019.01) |
| *B60L 53/66* | (2019.01) |
| *B60L 53/67* | (2019.01) |
| *B60L 55/00* | (2019.01) |

(Continued)

(52) U.S. Cl.
CPC ............ *B60L 50/60* (2019.02); *B60L 53/305* (2019.02); *B60L 53/50* (2019.02); *B60L 53/62* (2019.02); *B60L 53/63* (2019.02); *B60L 53/66* (2019.02); *B60L 53/665* (2019.02); *B60L 53/67* (2019.02); *B60L 55/00* (2019.02); *H02J 3/14* (2013.01); *H02J 3/322* (2020.01); *B60Y 2200/91* (2013.01); *B60Y 2300/91* (2013.01); *H02J 7/0071* (2020.01); *H02J 13/00002* (2020.01)

(58) Field of Classification Search
CPC .................................................. B60L 55/00
See application file for complete search history.

(56) References Cited

U.S. PATENT DOCUMENTS

| | | | | |
|---|---|---|---|---|
| 2011/0285345 | A1* | 11/2011 | Kawai | H02J 7/0013 320/107 |
| 2013/0166081 | A1* | 6/2013 | Sanders | G05B 11/01 700/286 |

(Continued)

OTHER PUBLICATIONS

EPO, Office Action for corresponding European Patent Application No. 18757513.9, dated Aug. 18, 2023, 12 pages.

*Primary Examiner* — David V Henze-Gongola
(74) *Attorney, Agent, or Firm* — NK Patent Law

(57) ABSTRACT

Method and apparatus for charging a battery of an electric vehicle (EV) may determine a power charging schedule for charging the EV from a microgrid, based on charging preference information for the EV, and also power consumption information for devices on the microgrid and alternative power resource information indicating availability of electric power for supply to the microgrid from an alternative power resource on the microgrid received via a communication network. A charging instruction signal for charging the EV from the microgrid, according to the power charging schedule, may be transmitted over the communication network.

22 Claims, 5 Drawing Sheets

Related U.S. Application Data

(60) Provisional application No. 62/462,095, filed on Feb. 22, 2017.

(51) Int. Cl.
    *H02J 3/14*     (2006.01)
    *H02J 3/32*     (2006.01)
    *H02J 7/00*     (2006.01)
    *H02J 13/00*    (2006.01)

(56) References Cited

U.S. PATENT DOCUMENTS

| | | | |
|---|---|---|---|
| 2014/0006137 A1* | 1/2014 | Melen | G06Q 10/1093 |
| | | | 705/14.35 |
| 2015/0345962 A1 | 12/2015 | Graham | |
| 2017/0005515 A1 | 1/2017 | Sanders | |
| 2017/0008413 A1 | 1/2017 | Reineccius | |
| 2017/0174090 A1* | 6/2017 | Lakamp | B60L 53/52 |
| 2018/0241229 A1* | 8/2018 | Kitaoka | B60L 53/00 |

* cited by examiner

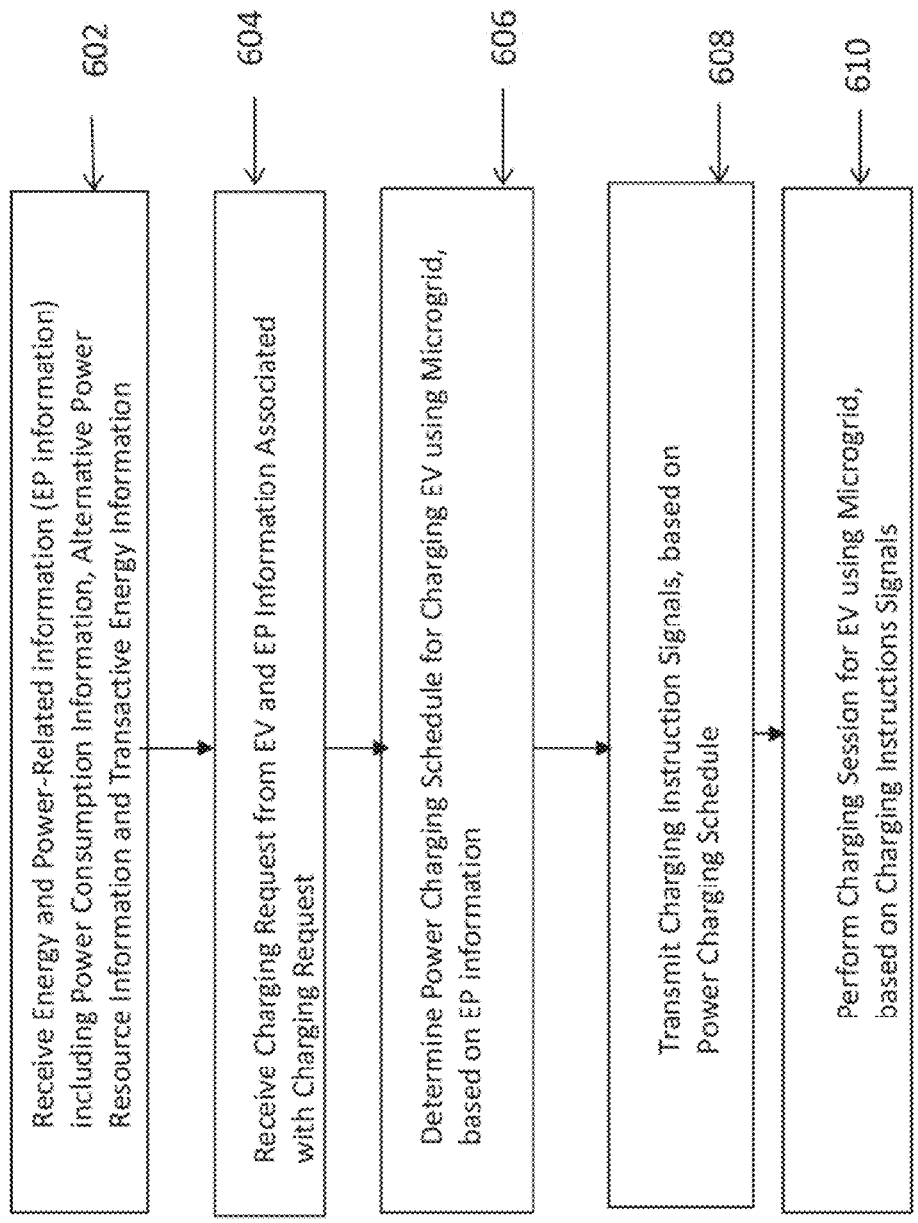

METHOD AND APPARATUS FOR CHARGING A BATTERY FROM AN ISOLATABLE ELECTRIC POWER GRID

CROSS-REFERENCE TO RELATED APPLICATIONS

This application is a continuation of U.S. patent application Ser. No. 16/487,638 filed Aug. 21, 2019, entitled "METHOD AND APPARATUS FOR CHARGING A BATTERY FROM AN ISOLATABLE ELECTRIC POWER GRID," which is a national phase entry under 35 U.S.C. § 371 of International Application No. PCT/US2018/019175 filed Feb. 22, 2018, entitled "METHOD AND APPARATUS FOR CHARGING A BATTERY FROM AN ISOLATABLE ELECTRIC POWER GRID," which claims priority to U.S. Provisional Patent Application No. 62/462,095 filed Feb. 22, 2017, entitled "Intelligent Charging System and Method". The disclosure of each of the aforementioned applications is incorporated herein by reference in their entireties.

TECHNICAL FIELD

The present disclosure generally relates to electric battery charging systems, and more particularly, determining a schedule for charging an electric battery included in a mobile apparatus, such as an electric vehicle (EV), using electric power supplied over an isolatable electric power grid ("microgrid"), based on information related to electric power consumption, electric power supply, energy generation and energy storage on the microgrid.

BACKGROUND

With the expected increase in the number of EVs in the near future, electric power charging requirements likely will increase. As a result, the existing electric power grid infrastructure, which includes utility power grids, distribution power grids and power grids at a residential or commercial level, may face challenges to satisfy the increased charging requirements.

The automotive industry has standardized a variety of charging methods for EVs. These methods include AC and DC charging methods. AC methods tend to be more universal within a country than DC methods. In AC charging, AC power is sent to the EV, which contains a charger and an energy storage (e.g., a battery). The charger in the EV is designed specifically for the battery of the EV, and charging control electronics are contained within the EV. AC charging, however, has a limited ability to charge a battery quickly due to power limits, as shown in the following table of example ranges.

| Voltage/Current Power | | | | |
|---|---|---|---|---|
| 110 V/ | 240 V/ | 240 V/ | 240 V/ | 240 V/ |
| 12 A | 16 A | 32 A | 48 A | 80 A |
| 1.3 kW | 3.5kW | 7 kW | 11.5 kW | 19.2 kW |

DC charging is more complex than AC charging, but may provide for much faster charging. DC chargers are external to the EV, such that DC charging requires more communications and power control between the charger and the battery than AC charging. Unlike in AC charging where the voltage is defined by the power utility, DC charging methods may be unilaterally defined by an EV manufacturer. To address the interoperability issue, DC charging standards have been developed. The standards specify multiple charging rates. For example, as shown in the table below, Level 1 charging allows for AC or DC charging and the DC charging option can deliver 4 to 40 kW, and Level 2 charging can charge DC-only from 10 to 100 kW. The more energy delivered to the battery, the faster it can be charged, within the limits of the specific battery's chemistry.

| Charge Method | Charger DC Output Voltage (V DC) | Max Current (Amps-continuous) | kW |
|---|---|---|---|
| DC Level 1 | 50-500 | 80 | 4-40 |
| DC Level 2 | 50-500 | 200 | 10-100 |

Currently, many families own multiple gasoline vehicles and a relatively small number own an EV. In the future, the likely trend is that families will own multiple EVs, and there will be an increased probability that one or more EVs will be visiting a home and require simultaneous charging sessions.

FIG. 1 illustrates a prior art residential (home) electrical power system 5. Electrical power may be provided from Grid 10 via a local transformer 20 to powerline customer premise distribution wiring 30 which extends to an electrical meter 70. For ease of reference and as used in the present disclosure, "local" refers to a low voltage transformer and any power equipment connected to the secondary winding of the transformer, i.e., load side, and "Grid" is the electrical power network upstream of the low voltage transformer. The Grid 10 may include sub-sections of different power capacities and types of control and/or availability. The transformer 20 may reduce the voltage from a medium voltage to the standard low voltage wall outlet voltage of about 110 Volts line-to-ground or 220 Volts line-to-line. The electrical meter 70 is "dumb", i.e., a device that does not make any decisions that affect charging or energy usage processes, which interconnects the wiring 30 to residential low voltage power distribution wiring 140. The system 5 may include electric vehicle supply equipment (EVSE) 55, which also does not make any decisions that affect charging or energy usage processes (i.e., a "dumb" EVSE), connected to the wiring 140. The EVSE 55 may include a power interface 52 to supply power to an EV 50, and a communication interface 54 over which EV power charging related information is exchanged with the EV 50. The system 5 may include alternative power resources such as a Distributed Energy Resource (DER) 110, an energy storage system 120 and a renewable energy resource (Renewable) 130. The energy storage system 120 may be embodied as a flywheel, molten salt, a water tower, a battery, pumped hydroelectric storage or other energy storage system. The Renewable 130 may include a consumptive energy resource such as a wood-fired generator, a small nuclear generator, solar cells, a solar panel array, a wind turbine, a water turbine, a biomass system, a geothermal system or other similar energy resources. The DER 110 may include any Renewable 130 or energy storage system 120, and also may include an EV that may have spare energy in its battery that can be shared or an EV engine that can be used to generate energy. The Grid 10 may be supplied electric power from a utility generator on the Grid 10, or a DER, Renewable or energy storage system which is a part of the Grid 10 or a local electrical power system, such as the system 5. In addition, the DER 110 and the Renewable 130 may contain a controller (not shown) that monitors electrical power output and synchronizes the supply of electrical power to the Grid 10 in order to supplement available energy on the Grid 10; directs energy of the DER 110 or the Renewable 130 to the energy storage system 120; and performs other power distribution functions as appropriate, such as load balancing and maintenance processes. Although information related to energy generated on or available from the system 5 may be communicated to a power distribution controller of the Grid 10 that manages supply of power on the Grid 10, the Grid controller treats the supplemental available energy simply as bulk power and does not consider charging needs of individual EVs.

FIG. 2 illustrates a prior art residential electric power system 5A which is similar to the system 5, and includes smart devices. For purposes of the present disclosure, a "smart" device is a device capable of making a decision that affects charging or energy usage processes. In the power system 5A, utility electrical power may be distributed from the Grid 10 via the local transformer 20 to local customer premise distribution wiring 30 extending to smart meters 70A at respective houses 40. The low voltage of the transformer is distributed to a house 40 at a maximum voltage level which in accordance with the current and voltage capabilities of the transformer 20, the customer premise distribution wiring 30, and the load center (not shown) of the house 40. The house 40 may include a smart charger 55A configured to control charging of an EV 50 and communication of EV power charging related information. The system 5A may further include controllers 100 and 102 of Renewables such as a solar panel array 80 and wind turbine 90, respectively, which may provide for communication of energy generation related information. The smart meter 70A may provide for exchange of energy generation and power consumption related information between the controllers 100, 102 and the Grid power distribution controller. Although energy generation and power consumption related information may be communicated among smart devices of the system 5A and the Grid controller, the charging needs of individual EVs that may desire to use EV chargers of the system 5A for charging are not considered at the smart devices of the system 5A or the Grid power distribution controller.

For example, in an electrical power system similar to the system 5 or 5A, a typical local step-down transformer may be capable of supplying power to an average of 3 to 5 houses. A traditional home residence may have a 200 Amp per line AC electrical service at 120 Volts, such that the power that can be delivered to the entire home is 24 kW. Typical local transformers are rated to deliver less than 500 KVA. (A VA is "volts multiplied by amps" without any phase shift between the voltage and current phases known as "power factor". If the load is purely resistive, 1 VA would be the same as 1 Watt.) In the event one of the home residences wired to a specific local transformer desires to perform fast Level 2 charging as described above, the local transformer may have insufficient capacity for the other residences. Also, the low voltage wiring of a home residence having several EV chargers may have insufficient capacity for charging multiple EVs at desired charging levels, when simultaneous charging using EV chargers at the residence is attempted.

Accordingly, there exists a need for method, apparatus and system for charging a battery of a mobile energy storage and power consumption apparatus, such as an EV, using power from a local power grid, efficiently, cost effectively and within the capabilities of the local power grid.

SUMMARY

In accordance with the present disclosure, a method for charging at least one battery may include controlling, by a processing device, at a power system control device, receiving, over a communication network, power consumption information of consumption devices on an electric power grid and alternative power resource information indicating availability of electric power for supply to the electric power grid from an alternative power resource on the electric power grid, in which a power resource system including the alternative power resource is on the electric power grid, and in which, when the electric power grid is in an isolated state, the electric power grid is capable to satisfy predetermined power consumption requirements respectively of the consumption devices, using electric power from the power resource system; determining, for a mobile energy storage and power consumption device, as a given combined power consumption and alternative power resource device on the electric power grid, a power charging schedule for charging a battery of the mobile energy storage and power consumption device, in accordance with charging preference information for the mobile energy storage and power consumption device, the power consumption information and the alternative power resource information; and transmitting, over the communication network, a charging instruction signal for charging the battery of the mobile energy storage and power consumption device from the electric power grid, according to the power charging schedule.

In one alternative, the power charging schedule may include supplying power to the power grid from the alternative power resource.

In one alternative, the charging instruction signal may indicate a charging apparatus on the power grid, and a time for charging the mobile energy storage and power consumption device at the charging apparatus.

In one alternative, the charging instruction signal may indicate a first time for supplying power from the mobile energy storage and power consumption device to the power grid and a second time for charging the mobile energy storage and power consumption device at a charging apparatus on the power grid.

In one alternative, the power charging schedule may be determined based on transactive energy information received over the communication network.

In one alternative, the power charging schedule may be determined based on at least one of information of charging apparatus availability, a current queue at a charging apparatus on the power grid, working status of the charging apparatus or a discount for charging, received over the communication network.

In one alternative, the power charging schedule may be determined based on information indicating at least one of state of charge, location or preferred time for charging of the mobile energy storage and power device, received over the communication network.

In one alternative, the charging instruction signal may include an instruction for a second mobile energy storage and power consumption device to supply electric power therefrom to the power grid at a first time prior to a second time indicated for charging of the mobile energy storage and power consumption device from the power grid.

In one alternative, the power charging schedule may be determined based on a change of a first power charging schedule of the second mobile energy storage and power consumption device to a second power charging schedule, in which the second mobile energy storage and power consumption device is a second combined power consumption and alternative power resource device on the power grid.

In one alternative, the charging instruction signal may include an instruction for the alternative power resource to supply power to the power grid at a time when the mobile energy storage and power consumption device is indicated for charging from the power grid.

In one alternative, the alternative power resource information may indicate a time period for supply of excess available power, and an amount of the excess available power for supply from the alternative power resource to the power grid, and wherein the charging instruction signal may be for charging the mobile energy storage and power consumption device using the excess available power from the alternative power resource at a charging apparatus of the power grid.

In one alternative, the charging apparatus may be identified in the alternative power resource information and associated with the alternative power resource.

In one alternative, the alternative power resource information may indicate time of availability and maximum power charging rate of the charging apparatus.

In one alternative, the alternative power resource information may indicate cost for charging using the charging apparatus.

In one alternative, the power consumption information may be based on at least one of sensor information from an Internet of Things (IoT) sensor of a given power consumption device, a device monitoring environmental conditions associated with the power grid or a user of electric power supplied over the power grid.

In one alternative, the power consumption information may include predicted energy consumption information determined from the sensor information.

In one alternative, the mobile energy storage and power consumption device may be an electric vehicle (EV), and the power charging schedule may be determined based on information of at least one of a driving route of a user of the EV, a favorite charging apparatus of the user, a preferred charging apparatus of the user or consumption of power from the power grid associated with user behavior.

In one alternative, the alternative power resource includes at least one of a Distributed Energy Resource (DER), a renewable energy resource or an energy storage system.

In accordance with the present disclosure, a method may provide for charging at least one energy storage device from an electric power grid, in which the electric power grid is operable in an isolated state from a distribution power grid, and in which the electric power grid is configured to be supplied with a predetermined maximum power from the distribution power grid. The method may include controlling, by a processing device, at a power system control device, receiving, over a communication network, alternative power resource information indicating availability of electric power for supply to the electric power grid from alternative power resources on the electric power grid, and condition information indicating current and expected energy storage and power consumption for the electric power grid, in which the condition information includes (i) power consumption condition information indicating current and expect power consumption by a plurality of power consumption devices including at least one stationary power consumption device and at least one mobile power consumption device, and (ii) energy storage condition information indicating current and expected energy storage at a plurality of energy storage devices which include at least one stationary energy storage device and at least one mobile energy storage device; determining, based on the condition information, predictive energy storage and power consumption information for the electric power grid; performing a prediction power charging scheduling process using the predictive energy storage and power consumption information, when a trigger condition is determined, wherein the process is performed to determine a plurality of power charging schedules for satisfying, from the electric power grid, expected power charging requirements of first power consumption devices of the plurality of power consumption devices at a predetermined future time period, based on the predetermined maximum power from the distribution power grid and the alternative power resource information, wherein the power charging schedules include first power charging schedules for storing energy generated at respective first alternative power resources on the electric power grid during a first time period before the future time period, at least one second power charging schedule for supplying power to the at least one stationary power consumption device before and during the future time period, and at least one third power charging schedule for charging from the electric power grid the at least one mobile energy storage device during the predetermined future time period; and transmitting, over the communication network, first, second and third charging instruction signals respectively according to the first, second and third power charging schedules.

In one alternative of the method, the trigger condition may be determined based on the predictive energy storage and power consumption information and is a determination of an anticipated energy shortage for the electric power grid during the predetermined future time period.

In one alternative of the method, the condition information may be real-time information and the trigger condition may be determined when the anticipated energy shortage determined from the predictive energy storage and power consumption information satisfies a predetermined critical energy shortage condition.

In one alternative of the method, the trigger condition may be determined when the condition information indicates a predetermined event has occurred or is to occur.

In one alternative of the method, the predetermined event may be a change in weather or environment, an anticipated traffic condition or a social event.

In one alternative of the method, the condition information may include information obtained from a social media network.

In one alternative of the method, the trigger condition may be determined using historic driving pattern or population behavior information.

In one alternative of the method, the trigger condition may be a predetermined set time.

In one alternative of the method, the predetermined set time may be a periodic time indicated by a time schedule.

In one alternative of the method, the predictive energy storage and power consumption information may indicate at least one of (i) a predictive pattern of energy storage and consumption for a predetermined class of energy consumers, (ii) a predictive model of operational status of energy equipment, or (iii) information indicating an incentive predicted to shift time of energy usage.

In one alternative of the method, the at least one mobile power consumption devices may include a plurality of mobile power consumption devices, and wherein the at least one mobile energy storage device includes a plurality of mobile energy storage devices, wherein the trigger condition is determined when the condition information indicates a predetermined event has occurred or is to occur, and wherein the process is performed to determine a plurality of fourth power charging schedules for satisfying, from the electric power grid, expected power charging requests from a first plurality of mobile power consumption devices of the plurality of mobile power consumption devices at the future time period.

In one alternative of the method, the first plurality of mobile power consumption devices and a first plurality of mobile energy storage devices of the plurality of mobile energy storage devices may be contained respectively in a plurality of electric vehicles (EVs).

In one alternative of the method, the third power charging instructions may be transmitted respectively in response to requests for charging received from the plurality of EVs over the communication network.

In one alternative of the method, the fourth power charging instructions may include directions for charging the first plurality of mobile energy storage devices respectively at a plurality of different locations on the electric power grid at a plurality of different times during the predetermined future time period, and wherein the predetermined future time period includes a first period before, a second time period during, and a third time period after a predetermined event indicated by the condition information.

In one alternative of the method, price of charging information may be indicated in one or more of the fourth power charging schedules, and a given price of charging in a given fourth power charging schedule is in accordance with at least one of time for charging by a charging apparatus on the electric power grid or location of the charging apparatus in relation to a location of the predetermined event.

In one alternative of the method, the method further include controlling, by the processing device, transmitting to second EVs of the EVs each containing a second mobile power consumption device and a second mobile energy storage device, over the communication network, fourth instruction signals determined according to the power charging schedules and for changing fifth power charging schedules respectively for charging the second mobile energy storage devices from the electric power grid determined before the trigger condition is determined, wherein the changed fifth power charging schedules include at least one of a first time for charging a given one of the second mobile energy storage devices from the electric power grid different from the future time period or a second time for discharging energy to the electric power grid from a given another of the second mobile energy storage devices during the future time period.

In one alternative of the method, the energy generated may be from solar or wind energy and stored at one of the first alternative power resources.

In one alternative of the method, the second charging instruction signals may direct the at least one stationary power consumption device to decrease power consumption from the electric power grid at a predetermined time before or during the predetermined future period.

In accordance with the present disclosure, an apparatus for charging at least one battery may include a processing device and a memory including instructions which, when executed by the processing device, control: receiving, over a communication network, power consumption information of consumption devices on an electric power grid and alternative power resource information indicating availability of electric power for supply to the electric power grid from an alternative power resource on the electric power grid, in which a power resource system including the alternative power resource is on the electric power grid, and in which, when the electric power grid is in an isolated state, the electric power grid is capable to satisfy predetermined power consumption requirements respectively of the consumption devices, using electric power from the power resource system; determining, for a mobile energy storage and power consumption device, as a given combined power consumption and alternative power resource device on the electric power grid, a power charging schedule for charging a battery of the mobile energy storage and power consumption device, in accordance with charging preference information for the mobile energy storage and power consumption device, the power consumption information and the alternative power resource information; and transmitting, over the communication network, a charging instruction signal for charging the battery of the mobile energy storage and power consumption device from the electric power grid, according to the power charging schedule.

BRIEF DESCRIPTION OF THE DRAWINGS

The foregoing aspects, features and advantages of the present disclosure will be further appreciated when considered with reference to the following description of exemplary embodiments and accompanying drawings, wherein like reference numerals represent like elements. In describing the exemplary embodiments of the present disclosure illustrated in the drawings, specific terminology may be used for the sake of clarity. However, the aspects of the present disclosure are not intended to be limited to the specific terms used.

FIG. 5 is an exemplary high level flow diagram of a method for determining a power charging schedule for charging an EV using a microgrid, in accordance with aspects of the present disclosure.

DETAILED DESCRIPTION

Overview

Figure 1:
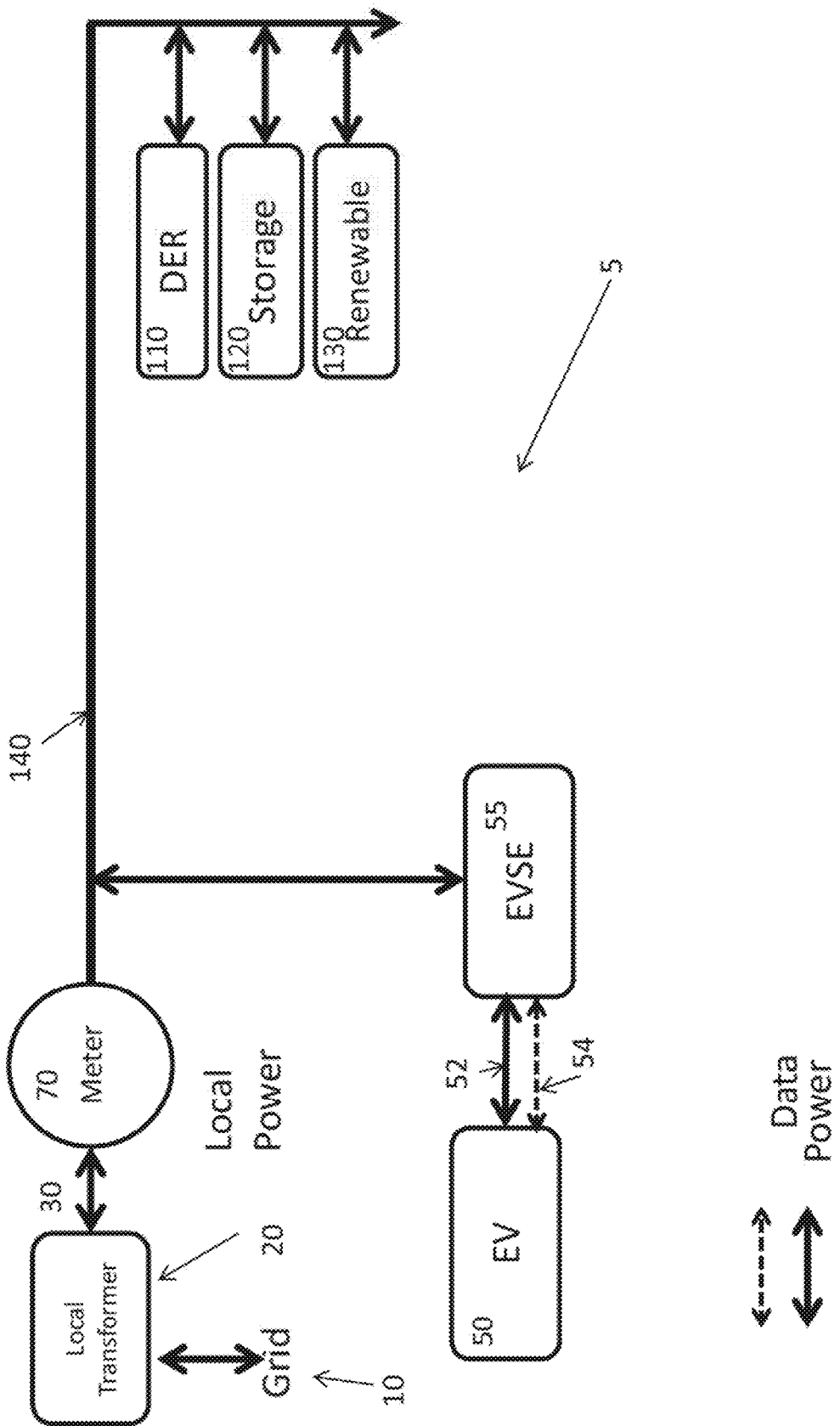
FIG. 1 is an illustration of a prior art residential electrical power system with a typical "dumb" electrical meter and "dumb" electric vehicle supply equipment (EVSE).
Figure 2:
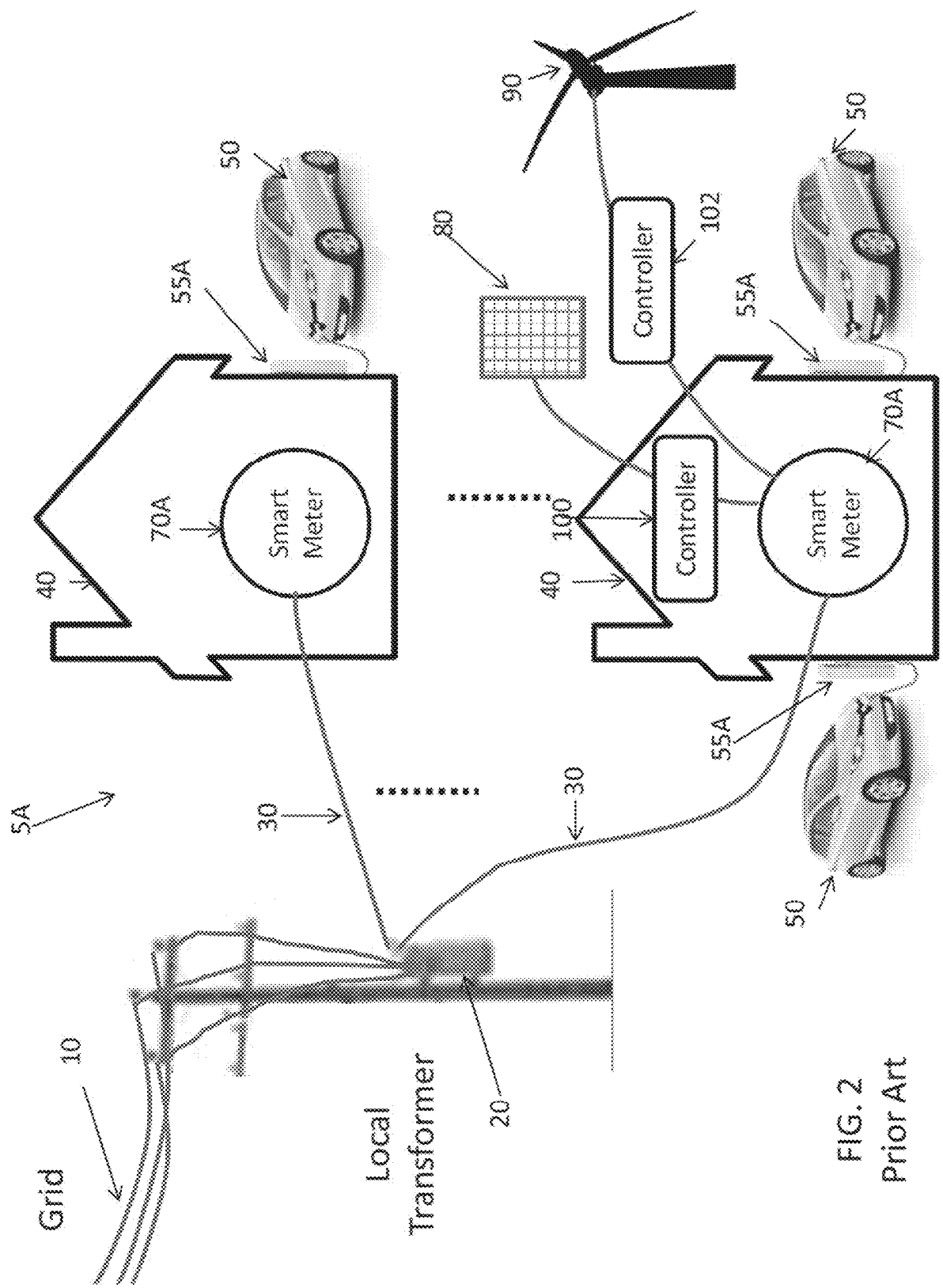
FIG. 2 is an illustration of a prior art residential electrical power system which includes smart EV charging apparatuses and smart electrical meters.

The technology of the present disclosure relates to, by way of example, a power system controller and method for controlling charging of one or more mobile energy storage and power consumption apparatuses, such as an EV, in a power-constrained application of a local power grid which is isolatable from the Grid ("microgrid"), according to a power charging schedule. The power charging schedule may be determined using one or more of (i) electric power consumption, energy storage and energy generation related information from controllers associated with power consumption devices, charging apparatuses and alternative power resources, such as a DER, Renewable and energy storage system, on the microgrid; (ii) transactive energy information, such as from a transactive energy market; (iii) information from Internet of Things (IoT) devices associated with users or others devices that may impact consumption of power on the microgrid; and (iv) information related to energy generation and power supply on a utility power grid (Grid) to which the microgrid may be selectively connected and disconnected.

In the present disclosure below, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with EV charging and an EV charging system have not been shown or described in detail to avoid unnecessarily obscuring descriptions of the embodiments.

Embodiments of the present disclosure are described generally with respect to a power system controller, which may be employed in commercial, industrial, residential and other settings for charging a battery. Although the present disclosure uses EV battery charging as an example, it is to be understood that the aspects of the present disclosure may apply to any energy storage device such as capacitors; any electrical power source such as DERs, Renewables, Storage and EVs, as well as to other applications such as electric airplanes, electric motorcycles and the like.

In accordance with an aspect of the present disclosure, a power charging schedule for charging a battery of an EV using a microgrid may be determined from available energy generation and storage and power supply and consumption related information communicated over a communication network(s) from a variety of sources. In one embodiment, the charging schedule may identify an EV charging apparatus on the microgrid to be used for EV charging, timing of EV charging using the EV charging apparatus, voltage and current to be used to supply power from an EV charging apparatus for charging the EV during a predetermined time period, and timing of storage of energy and generation of power from the stored energy for supply on the microgrid by one or more alternative power resources on the microgrid.

In accordance with an aspect of the present disclosure, the charging schedule for a specific EV may be determined based on an EV user's expectations and condition of the battery of the EV being charged, and local factors such as capabilities of an EV charging apparatus and constraints on the electrical power supply, such as, for example, whether an electric water heater is active at a residence which is supplied power from the microgrid and has its own EV charging apparatus.

In accordance with an aspect of the present disclosure, the charging schedule may be determined in accordance with external factors associated with multiple layers in a power distribution hierarchy. For example, the power distribution hierarchy may include a utility generator, high voltage distribution, low voltage distribution and local customer premise distribution, and external factors associated with the hierarchy may include public policy, tariffs, energy conservation programs, energy being used by other loads on the Grid (e.g., rolling brownouts), etc.

In accordance with an aspect of the present disclosure, the charging schedule may be determined based on transactive energy information which includes information relating to external factors for determining power distribution according to a Transactive Energy model. The Transactive Energy model may be an implementation of a financial model that weighs and analyzes various factors to create a market price and terms and conditions for the purchase of energy. For example, energy consuming devices and systems bid to buy energy, and energy producing devices and systems bid to sell energy. The market, based on the sum of all bids (both to sell and buy), may set a price ("clearing price"), where demand and supply are equal, and this process may repeat itself every fixed period of time, such as every 5 minutes. In the Transactive Energy model, the energy demand may be generated by the "best" combination of central (e.g., utility power plant) and local DERs (e.g., home solar cells). "Best" may mean a combination of many factors including lowest cost, lowest polluting, most efficient and other related technical and financial factors. These factors may be determined by a series of metrics, such as wire capacity, raw material cost (e.g., coal, gas, water), cost to convert the raw materials into power (e.g., labor, shipping, weather, and processing) and alternative energy availability (e.g., wind, water, solar and stored energy sources). In the Transactive Energy model, the market drives the control of energy consuming devices. In one embodiment, determination of a power charging schedule responsive to a request for battery charging may be in accordance with selecting a device to consume energy that demonstrates a higher social need metric (e.g., an emergency or medical need) or is willing to pay a premium for the energy on the "energy market". In other words, if a device, such as an EV, bids less than the clearing price, the device may not receive any power during a next power supply timeslot indicated by a power charging schedule for the device.

As discussed in detail below, the technology of the present disclosure may incorporate transactive energy information related to the Transactive Energy model or similar processes into its capabilities and decision rules for determining a power charging schedule for an EV. The rules may use metric data to represent different factors that may be considered in determining the charging schedule. The metric data may be categorized into ranges of values, real-time analog and event signals, or any other data sets which represent information valuable to a decision process that intelligently determines a power charging schedule for an EV.

EXAMPLE SYSTEMS

Figure 3:
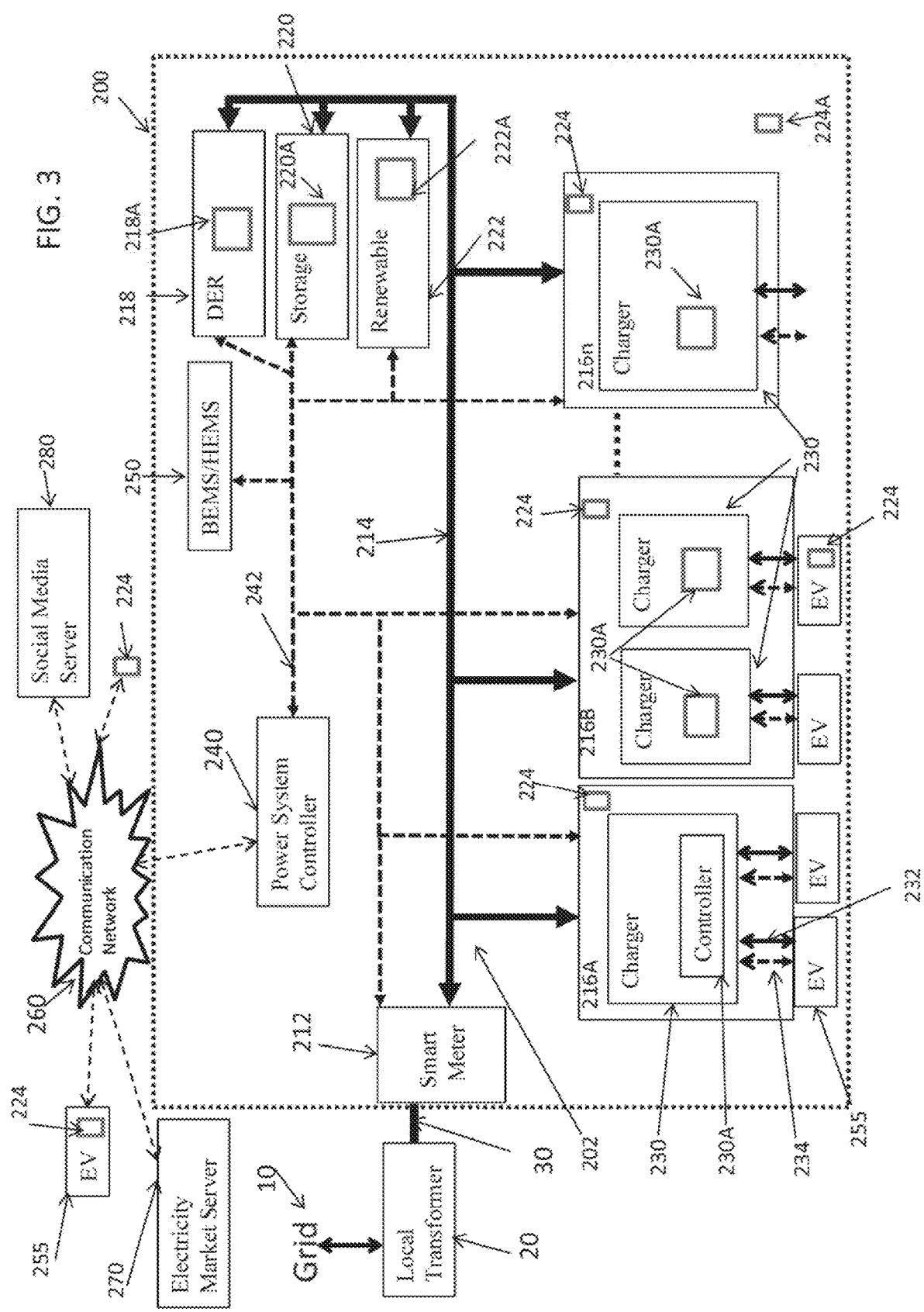
FIG. 3 is a block diagram of an exemplary electrical power control system, in accordance with aspects of the present disclosure.

FIG. 3 illustrates a block diagram of an exemplary local electric power system 200 which may include a power system controller 240 configured to determine a power charging schedule for charging a battery of an EV using a microgrid 202 of the system 200, according to an aspect of the present disclosure.

Referring to FIG. 3, the system 200 may include, in addition to the power system controller 240, a smart meter 212, EV charging apparatuses 230 including respective controllers 230A, alternative power resources including a DER 218, an energy storage system 220 and a Renewable 222 having respective controllers 218A, 220A, 222A, a Building Energy Management System (BEMS) and Home Energy management system (HEMS) controller 250, Internet of Things (IoT) sensor devices 224, a low voltage powerline 214 and a communication network 242.

The local transformer 20 may couple Grid 10 to powerline customer premise distribution wiring 30, and the smart meter 212 may couple the wiring 30 to the low voltage powerline 214. The powerline 214 may extend to houses 216, such as houses 216A, 216B and 216C, and the alternative power resources including the DER 218, the energy storage system 220 and the Renewable 222. A house 216 may include one or more EV charging apparatuses 230 connected to the powerline 214. In addition, each EV charging apparatus 230 may include a power interface 232 and a communication interface 234 for coupling to corresponding interfaces of an EV 255, and a power interface (not shown) for coupling to the powerline 214. The houses 216 may include or be associated with IoT devices 224 each including a controller (not shown). In addition, the houses 216 may include power consumption devices (not shown) that consume power supplied from the powerline 214. The communication network 242 may communicatively couple the system controller 240, the smart meter 212, the BEMS/HEMS controller 250 and the controllers respectively of the EV charging apparatuses 230, the DER 218, the storage system 220, the Renewable 222 and the IoT devices 224 with one another. In addition, the power system controller 240 may be communicatively coupled with a communication network 260 which is external to the system 200. In one embodiment, the system controller 240 may be communicatively coupled via the network 260 to an Electricity Power Market server 270 and controllers (not shown) respectively of EVs 255, and also to a social media network or server 280.

The microgrid 202 of the system 200 may include the entirety of the wiring 214. For ease of reference, any power supply, power consumption, energy generation or energy storage device of the system 200 is referred to below as being "on the microgrid 202". In addition, a given EV 255 may be on the microgrid 202, when a power charging schedule for charging a battery from the microgrid 202 identifies the given EV 255 for supplying power to or consuming power from the microgrid 202.

Figure 4:
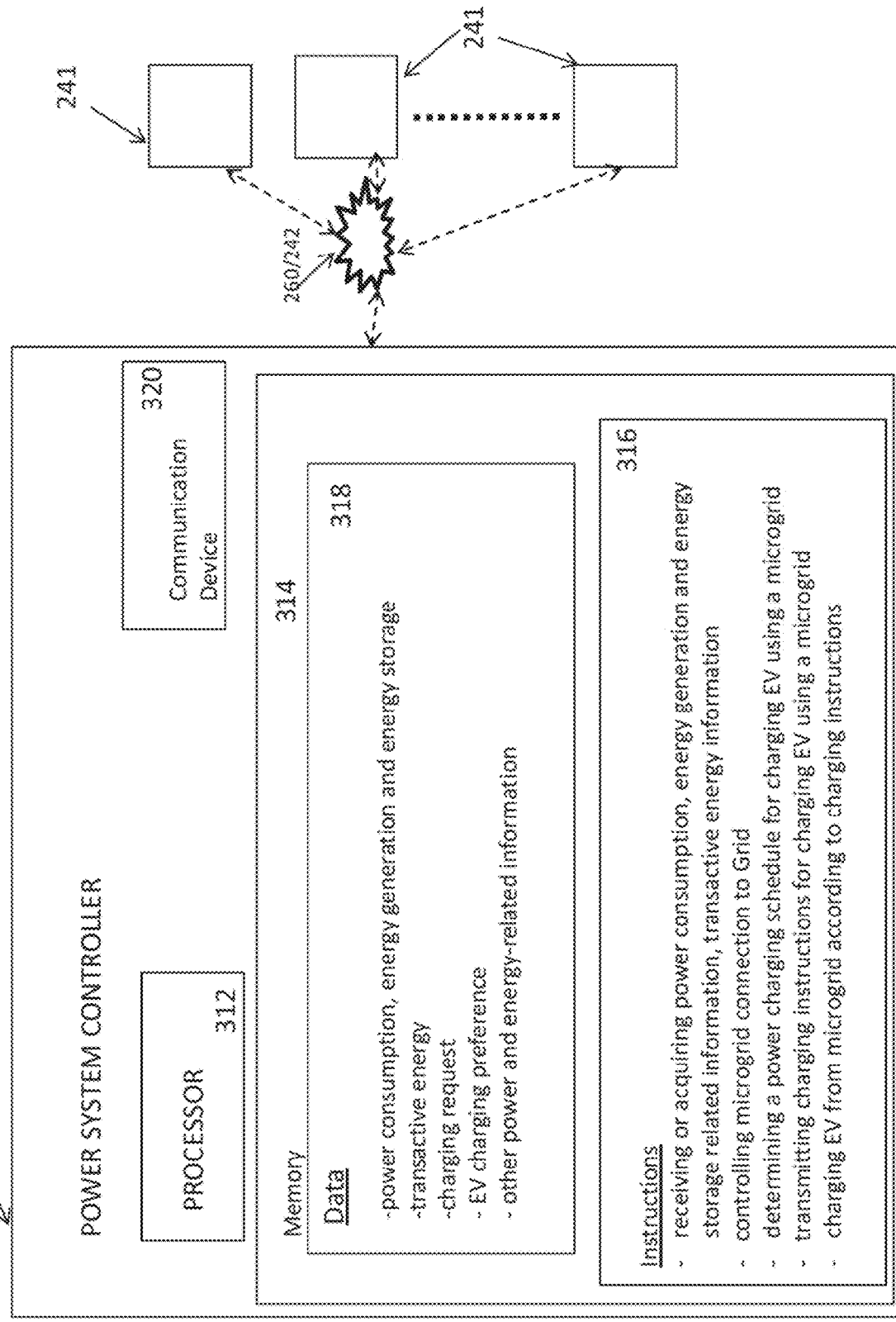
FIG. 4 is an illustration of a block diagram of an exemplary power system controller and computing devices of or associated with the power control system of FIG. 3, in accordance with aspects of the present disclosure.

FIG. 4 illustrates an exemplary embodiment of the power system controller 240, which may be in the form of a computing device that includes one or more processors 312, one or more memory 314, and other components commonly found in computing devices.

The memory 314 may store information accessible by the one or more processors 312, including instructions 316 that may be executed by the one or more processors 312. Memory may also include data 318 that can be stored, manipulated, or retrieved by the processor. Such data 318 may also be used for executing the instructions 316 and/or for performing other functions. Such memory may be any type of non-transitory media readable by the one or more processors, such as a hard-drive, solid state hard-drive, memory card, ROM, RAM, DVD, CD-ROM, write-capable, read-only memories, etc.

The instructions 316 may be any set of instructions capable of being read and executed by the one or more processors 312. The instructions may be stored in a location separate from the computing device, such as in a network attached storage drive, or locally at the computing device. The terms "instructions," "functions," "application," "steps," and "programs" may be used interchangeably herein.

Data 318 may be stored, retrieved and/or modified by the one or more processors 312 in accordance with the instructions 316. Such data may be stored in one or more formats or structures, such as in a relational or non-relational database, in a SQL database, as a table having many different fields and records, XLS, TXT, or XML documents. The data may also be formatted in any computing device-readable format. In some embodiments the data may be encrypted. In addition, the controller 240 may include a communication device 320 configured to provide wired or wireless communication capabilities.

The one or more processors 312 may be any type of processor, or more than one type of processor. For example, the one or more processors 312 may be CPUs from Intel, A M D, and Apple, or application specific integrated circuits (ASIC) or system on chips (SoCs).

FIG. 4 illustrates the components of the controller 240 as being single components, however, the components may actually comprise multiple processors, computers, computing devices, or memories that may or may not be stored within the same physical housing. For example, the memory may be a hard drive or other storage media located in housings different from that of the controller 240. Accordingly, references to a processor, computer, computing device, or memory herein will be understood to include references to a collection of processors, computers, computing devices, or memories that may or may not operate in parallel. Further, although some functions described below are indicated as taking place on a single computing device having a single processor, various aspects of the subject matter described herein may be implemented by a plurality of computing devices in series or in parallel.

Referring to FIG. 4, the controller 240 may be configured to provide specific functions in accordance with embodiments of the present disclosure, and in some embodiments may be programmed with programs to perform some or all of the operations described herein. In some embodiments the controller 240 may be programmed to store, in the memory 314, energy generation, energy storage and power consumption data received from any of the components of the system 200. Also, the controller 240 may be programmed to store, in the memory 314, transactive energy data received from the server 270, charging request and user charging preference information received from a controller of an EV 255, and other energy and power related data that may be received from a component external to the system 200, such as over the network 260 or power lines of the Grid 10. Further, the controller 240 may be programmed to store energy and power consumption and generation related information that may be indicated in social media posts or social media communications associated with a social media server or network, such as acquired automatically or received from the server 280. In addition, the controller 240 may store, in the memory 314, instructions for controlling: receiving or acquiring energy generation, energy storage and power consumption data; connection and disconnection of the microgrid 202 respectively to and from the Grid 10; determining a power charging schedule for charging a battery of an EV using the microgrid 202; transmitting charging instructions to control power supply over the mircogrid 202 and charging of the EV using the microgrid 202 according to the power charging schedule; and charging the EV from the microgrid 202 at an EV charging apparatus 230 on the microgrid 202, according to the charging instructions.

Referring to FIG. 4, each of the smart meter 212, controllers 218A, 220A, 220A, 230A, the server 270, the server 280 and controllers (not shown) of EVs 255 and IoT devices 224 may be configured in the form of respective computing devices 241 similar to the controller 240, and include one or more processors, memory and instructions as described above. Each computing device 241 may be a personal computing device, such as intended for use by a user, and have all of the components normally used in connection with a personal computing device such as a central processing unit (CPU), memory (e.g., RAM and internal hard drives) storing data and instructions, a display (e.g., a monitor having a screen, a touch-screen, a projector, a television, or other device that is operable to display information), and a user input device (e.g., a mouse, keyboard, touch-screen, or microphone). Although not shown, the controller 240 may also include a display and a user input device.

Although each computing device 241 may comprise a full-sized personal computing device, each computing device 241 may alternatively comprise a mobile computing device capable of wirelessly exchanging data with a server, such as the controller 240, over a network, such as the Internet. By way of example only, a computing device 241 may be a mobile phone or a wireless device such as a wireless-enabled PDA, a tablet PC, a netbook or an IoT device. In another example, a computing device 241 may be a laptop computer.

Referring again to FIG. 3, each of the controllers 218A, 220A, 222A, 230A, 240 and 250 of the system 200 may be communicatively connected with each other via the network 242, and/or may be directly connected to each other. The network 242 may include interconnected protocols and systems. For example, the network 242 may be implemented via the Internet, intranets, local area networks (LAN), wide area networks (WAN), etc. Communication protocols such as Ethernet, Wi-Fi, and HTTP, Bluetooth, LTE, 3G, 4G, Edge, etc., and various combinations of the foregoing may be used to allow nodes to communicate. In one embodiment, IoT protocols may be used to allow interconnection of IoT devices 224 with controllers of the system 200. In another embodiment, the network 242 may also include peer-to-peer wiring.

Each of the controllers 218A, 220A, 222A, 230A, 240 and 250 may be implemented by directly and/or indirectly communicating over the network 242. In this regard, each of the controllers 218A, 220A, 222A, 230A, 240 and 250 may be at different nodes of the network 242 and capable of directly and indirectly communicating with other nodes of the network 242. As an example, each of the controllers 218A, 220A, 222A, 230A, 240 and 250 may include web servers capable of communicating with another computing device via the network 242, and with a computing device external to the system 200 via the network 260. For example, the controller 240 may use the network 242 to transmit and present information to a user, such as a user of an EV or an owner of an alternative power resource, on a display, such as displays respectively of controllers 218A, 220A, 222A and 230A.

The network 260 may be any communication network, such as the Internet, intranets, local area networks (LAN), wide area networks (WAN), etc. Referring to FIG. 4, in one embodiment, the network 242 may be a part of, or the same network as, the network 260.

In one embodiment, the smart meter 212 may be a power control device capable of measuring and controlling or helping to control, through messaging and signaling means, energy consumption (Grid 10 to load of the power system 200) and energy generation (load of the power system 200 to Grid 10), and may communicate with other components of the power system 200 to receive energy and power related information. In addition, the smart meter 212 may operate to selectively connect the microgrid 202 to the Grid 10 and disconnect (isolate) the microgrid 202 from the Grid 10, for example, under control of the system controller 240. As described below, several advantages may be obtained that improve charging a battery of an EV 255, by determining a schedule for charging the battery of an EV 255 using an isolatable local power grid, such as the microgrid 202, according to the technology of the present disclosure.

The EV charging apparatus 230 may include an AC/DC or DC charger as the power interface 232. As shown in FIG. 3, the EV charging apparatus 230 may be configured to charge a single or multiple EVs, and a house 216 may include multiple EV charging apparatuses 230. In one embodiment, power charging schedules for charging respective EVs may be determined, in part, within a single controller 230A of the EV charging apparatus 230, such as in house 216A, which may resulting in fast, secure and robust EV power charging. In one embodiment where the system 200 includes an apartment building instead of a house and EVs to be charged have different owners but are charged at a same location, a single EV charger-per-EV configuration as shown for the house 216B may be more practical and desirable. In addition, the charging configuration of house 216B may be more practical where, for example, EV charging requirements are incompatible and consequently need different charger technologies, EVs may be spaced too far apart to safely or physically distribute the charging energy, or EV charging apparatuses are separately owned by respective EV owners.

The alternative power resources of the DER 218 and the Renewable 222 may generate energy and output electrical power based on the generated energy, similar to the DER 110 and Renewable 130 described above. In addition, the respective controllers 218A and 222A of the DER 218 and the Renewable 222 may control transmitting energy generation and power output related information to the system controller 240; receiving control information from the system controller 240 for controlling the output of power therefrom; and managing, based on the control information, output of power to the microgrid 202 from the energy generated.

The alternative power resource of the storage system 220 may store energy which may be used to output electrical power, similarly as described above for the storage system 120. In addition, the controller 220A of the storage system 220 may control transmission of energy storage and power output information to the system controller 240; receiving control information from the system controller 240 for controlling storage of energy, such as from power output on the microgrid 202 based on energy from a DER 218 or Renewable 222; and receiving control information from the system controller 240 for controlling output of power to the microgrid 202 based on the stored energy of the system 220.

The BEMS/HEMS controller 250 may monitor and manage power consumption, such as at houses 216, on the power system 200, and communicate information based on such monitoring and power management. The controller 250 may, for example, manage energy supervisory control and data acquisition needs of a house 216. The controller 250 may be communicatively connected over the network 242 to other power consumption devices of the system 200 that affect energy consumption, and hence the ability to charge an EV from the microgrid 202. For example, the controller 250 may control and monitor HVAC, dehumidifiers, sun shades, whole house fans, vents, and other home controls that affect the comfort and energy consumption of a house 216.

In one embodiment, the server 270 may be a computing device, having components similar to the computing devices 241, that receives and transmits electricity (energy) market transactive energy information, such as a clearing price for electrical power supply, and also other transactive energy information related to a Transactive Energy model.

In one embodiment, the server 280 may be a computing device, having components similar to the computing devices 241, on which social media information may be posted or exchanged. The server 208 may be accessed to acquire, or may automatically provide, social media information which may indicate energy and power consumption and generation related events, such as, for example, a change in weather, time and location of a future social event that is likely to cause an increase in an energy consumption at or near the location for a period before and a period after the event, as well as during the event.

In accordance with one aspect of the present disclosure, the controller of an EV 255 may include a mobile app which a user of the EV may configure to allow access, by the controller 240, to various user preferences, a calendar, location information, etc. In addition, the mobile app may communicate with the controller 240, or controllers 230A at the EV charging apparatuses 230 of the system 200, via the network 260 and the network 242, to receive notifications, for example, on charger availability, current charger queues, out-of-order chargers, discounts and other power charging services. The mobile app may also be configured to learn the EV user's driving routes, favorite or preferred EV charging apparatuses and energy usage behavior while the user is at home, such as in circumstances where the user resides at a house 216 of the system 200, and communicate such information to the controller 240. In one embodiment, any of the above-indicated or similar energy and power related information collected or generated by the mobile app at the controller of an EV may be automatically transmitted as EV power-related information over the communication network 260 to the controller 240.

In accordance with aspects of the present disclosure, any of the controllers 218A, 220A, 222A, 230A and 250, the smart meter 212 and a computing device external to the system 200, may be configured to perform all or a portion of the methods described herein, including all of the functions of the controller 240. For example, one or more computing devices may be configured to provide specific functions in accordance with embodiments of the technology. In this regard, one or more computing devices may maintain one or more storage devices on which energy and power related data as well as other additional data used to control charging of a battery of an EV from the microgrid 202, and to determine a power charging schedule for charging the battery of the EV 255 from the microgrid 202, may be stored.

Referring to FIGS. 3 and 4, it is to be understood that an electrical power system, such as the system 200, may include any number of communicatively connected computing devices 241 as controllers of respective power consumption, energy generation and energy storage components of the system 200, with each different computing device being at a different node of the network 242.

In accordance with an aspect of the present disclosure, the controller 240 may perform processing to decide how to best charge devices on the microgrid 202, including an EV(s) that requests charging using the microgrid 202, based on energy and power related information received over the network 242 from controllers of the power system 200, and also energy and power related information from external the power system 200, such as from the server 270, the server 280, the Grid 10, controllers of EVs 255 and controllers of IoT sensor devices 224 that are not part of the system 200, such as an IoT sensor device worn by a user of an EV 255. As described below, the controller 240 may receive information about the physical, social and electrical environment, EV user requirements, types of devices being charged and power capacity of the system 200, and process such information to determine a power charging schedule which is a best or highly desirable way to charge devices on the microgrid 202, which may include EVs 255 that request charging from the microgrid 202.

EXAMPLE METHODS

For purposes of illustrating the features of the present disclosure, an exemplary process for determining a power charging schedule for charging a battery of an EV 255 using a microgrid, such as the microgrid 202 of the system 200 as shown in FIG. 3, is described below in connection with operations performed at components of the power system controller 240.

Referring to FIG. 5, a high-level block diagram 600 of a method for charging a battery of an EV 255 using the microgrid 202 of the system 200 is illustrated.

In block 602, the controller 240 may receive, via the network 242, energy generation and storage and power consumption related information for the microgrid 202 from any of the controllers of components 218, 220, 222, 230 and 250 and the smart meter 212. In addition, the controller 240 may receive via the network 260, or from the smart meter 212 via the network 242, energy and power related information associated with the Grid 10, such as capabilities, expected power usage, costs and the like. Further, the controller 240 may receive over the network 260, from a controller of an EV 255, energy storage status information indicating available battery charge at the EV, current and expected energy consumption level information and current and expected location information indicating current and expect location of the EV over a predetermined time period. In addition, the controller 240 may receive, over the network 242 or the network 260, IoT information from IoT devices 242 on or associated with users or devices that may affect power consumption and energy generation and storage on the microgrid 202. For ease of reference, any energy and power related information which is received at the controller 240 and may be used to determine a power charging schedule for an EV according to aspects of the present disclosure is referred to herein as EP information. In some embodiments, in block 602 the controller 240 may automatically continuously or periodically attempt to acquire desired EP information, over the network 242 or 260, from available sources of EP information.

In one embodiment, the EP information may be from smart meters (not shown) of respective houses 216 using the local transformer 20, and indicate respective current and anticipated load demand and capabilities. Also, the EP information may indicate any other alternative power resources available for use at any house of the system 200, such as an EV 255 with a fully charged battery, and the actual or predicted load for the house. In a further embodiment, the EP information may concern a power infrastructure specification of the Grid 10, such as current limits on transmission lines, transformer specifications that are not to be exceeded, and the like.

In one embodiment, the EP information may include alternative power resource information indicating time of availability and maximum power charging rate of a charging apparatus 230 associated with an alternative power resource, such as a DER 218 or Renewable 222 which is associated with an energy storage system 220, cost for charging using the charging apparatus 230, and identity of a charging apparatus 230 to be used for charging using excess power output from a DER 218 or Renewable 222 or power from energy stored in a storage system 220.

In one embodiment, the EP information received at the block 602 may be from public charging stations or curbside chargers on the microgrid 202 that publish forecasted availability.

In block 604, the controller 240 may receive, via the network 260 or the network 242, a request for charging an EV 255. The request, for example, may be from a controller of the EV 255, a smart phone or other communication device, such as an IoT device 242 of a user of the EV 255.

In one embodiment, the request may be from a smart-phone and part of a message, such as "I am headed toward the charger. My ETA is twenty minutes." or "My owner wants a priority charge at 4 μm and needs to leave for a thirty mile trip by 5 μm. The destination has a public Level 1 charger reserved". Alternatively, the message may be "Complete any open charging sessions and prepare for my arrival. Inform the last session owner (by text message, phone call, email, Picture in Picture on their TV set, etc.) to move the EV." In one embodiment, the message may include preferences of the user of the EV, such as required or available amount of energy, time of arrival and departure from an EV charging apparatus, desired price, upper price limit, preservation of battery health or lifetime, etc. In one embodiment, the message may include a driving route of a user of the EV, a favorite EV charging apparatus of the user, a preferred EV charging apparatus of the user or information related to consumption of power from the microgrid 202 associated with user behavior.

In addition, in block 604 the controller 240 may, based on receipt of the charging request, access, via the network 260, GPS, mapping and calendar applications of a smart phone, such as of a user of another EV 255 who lives in a home 216 of the system 200, to obtain EP information therefrom. The EP information obtained in block 604 may indicate, for example, whether a user of the another EV 255 who charges his EV using the microgrid 202 intends to be away for the weekend with his EV and no charging sessions using the microgrid 202 are needed. Further, in block 604, the controller 240 may access information from IoT devices 224 which indicate data about a house 216 on the microgrid 202, such as whether anyone is at a house 216 or users of the house 216 are in bed, which may indicate the users of the house 216 are not likely to need to use their EV in the near future.

In block 606, the controller 240, using the EP information received in block 602, and other EP information that may be received in block 604 and information of the charging request, may determine a power charging schedule for the EV 255 responsive to the charging request, where the EV 255 is to be charged using power supplied from the microgrid 202. In one embodiment, the power charging schedule may indicate a specific time period for charging the EV 255 from a particular EV charging apparatus 230, and current and voltage levels to be used for supplying power from the apparatus 230 during the time period. In one embodiment, the power charging schedule may indicate that the time period includes several sub-periods, where one or more of the sub-periods has a current level and/or voltage level to be used for supplying power from the apparatus 230 to the EV 255 different from that of another sub-period.

In accordance with an aspect of the present disclosure, the controller 240 may be configured to self-organize the system 200 so that any power resources that form a power resource system providing for supply of power to the microgrid 202 are used effectively to provide full and reliable charging capability, based on the charging request. For example, the system 200 may be configured, under control of the controller 240, to be self-organizing and capable of operating as a centralized and decentralized (distributed) system which implements "Islanding" of the system 200. Islanding is a controlled disconnection of a small self-sufficient microgrid from a main utility grid. For example, the controller 240 may self-organize the system 200 such that the microgrid 202 is isolated from the Grid 10, and a power resource system of the system 200, which does not include the Grid 10 as a source of power for the microgrid 202, may satisfy predetermined power consumption requirements of power consumption devices on the microgrid 202. In some embodiments, a microgrid may cover a relatively small geographical area, and may be connected to and disconnected from the Grid 10 as needed and suitable, for example, depending on whether the controller 240 determines that power generation capabilities on the microgrid 202 may cover energy demands on the microgrid 202.

In some embodiments, a local electrical power system, such as the system 200, may be configured such that a microgrid thereof covers a suburb/neighborhood, rural district, university or large office campus, etc., and relies on local DER on the microgrid for satisfying power consumption requirements on the microgrid. Advantageously, by islanding to disconnect the microgrid 202 from the Grid 10, the controller 240 may reserve alternative power resources on the microgrid 202 and communicate status at a local level quickly and efficiently, and also compensate for power system failures and cyber-attacks, as well as reduce vulnerability to a physical service attack. The determination of a power charging schedule for a specific microgrid may provide that local variations in renewable energy output may be easily accounted for with a relatively smaller amount of data and variability. Thus, advantageously, the use of an isolatable microgrid to determine a power charging schedule for an EV may avoid the need for substantial computational power and data storage, which is typically required when a charging decision is made based on energy generation and storage and power consumption information associated with a large sized electric power grid, such as covering a large city which may have upwards of hundreds of thousands of power consumption devices and energy storage and generation devices.

In block 606, the controller 240 may apply metrics from a variety of types of EP information to make logical decisions within the power supply constraints of the microgrid 202 of the system 200 and the EP information available. In one embodiment, the power charging schedule may be determined such that the schedule satisfies an objective or rule for minimizing overall charging price, subject to a number of constraints, such as transformer power limits. In one embodiment, the power charging schedule may be in accordance with a charging process found in various standards, such as the ISO/IEC 15118 family of standards. In another embodiment, the power charging schedule may need to satisfy safety conditions for EV charging.

In one embodiment, the controller 240 may process EP information based on rules established to predict current and future likelihood for charging demand. In one embodiment, based on application of such rules, the controller 240 may determine a power charging schedule for, for example, a Level 2 charging session for an EV, which indicates when such session, or any other charging session for another EV, can start, and an expected duration of the charging schedule at a particular EV charging apparatus 230 on the microgrid 202.

In one embodiment, the controller 240 may determine the schedule using alternative power resource information from the controllers respectively of the alternative power resources 218, 220 and 222. For example, the controller 240 may determine whether alternative local energy is available which may provide cheaper and more renewable energy in place of or in addition to the utility power capabilities. In another embodiment, the controller 240 may use a combination of a local weather forecast and information from a local IoT weather sensor device 224A, which may indicate that a renewable energy source such as solar or wind may become available or become not available within a predetermined time window being considered for charging. In another embodiment, the controller 240 may determine a power charging schedule for charging the EV from the microgrid 202 based on the request from the EV, relying upon combinations of metric data that are determined to be a desired or a best combination of factors that ensure a desired result including lowest cost, fastest recharge rate, lowest pollution and most reliable energy source.

In another embodiment, the controller 240, based on the EP information available and various pre-configured rules, may determine a power charging schedule which provides that EV charging is performed at a lowest possible cost and carbon footprint. For example, the charging schedule may provide that the microgrid 202 is initially disconnected from the Grid 10 and solar energy generated at a Renewable 222 is stored at the storage system 220 instead of being used to supply power to the Grid 10, and when the EV returns to a house 216 in the evening when solar energy is not generated at the Renewable 222, the stored energy at the system 220 is used to recharge the EV.

In one embodiment, the controller 240 may use EP information received from the BEMS/HEMS controller 250 to learn, such as by machine learning, about a user's energy use behavior. The controller 240 may use energy user behavior information to optimize and weight the EP information from the BEMS/HEMS controller 250 for use in determining the power charging schedule. In some embodiments, the controller 240 may use machine-learning-based analytics to learn behaviors of a variety of entities on the microgrid 202, e.g., a house, a building, a transformer, etc., with respect to energy usage or power delivery. These behaviors may also change based on time (day/night, weekday/weekend) and season, and the controller 240 may learn about such changes in behavior and incorporate such learning into a determination of a power charging schedule.

In one embodiment the controller 240 may use transactive energy information to determine the charging schedule. The transactive energy information may be based on results of energy consumers and producers submitting bids to buy and sell, respectively, a specific amount of energy for a certain price to an energy market, from which the clearing price is determined. The controller 240 may acquire information of the results of such bidding, including information indicating a user who accepts a clearing price, and determine a power charging schedule for an EV, based on those consumers who bid at or above the clearing price or accepted the clearing price. As the bid submission and acceptance of the clearing price may be repeated (typically every few minutes), the controller 240 may rely upon real-time pricing to determine a power charging schedule. In one embodiment, a controller of an EV or a charging apparatus 230 on the microgrid 202 may execute a process that creates a bid based on preferences of the owner thereof.

In one embodiment, the controller 240 may rely, in particular, upon transactive energy information from the server 270, and also EP information from an EV controller, to determine the power charging schedule for a particular EV. For example, if an EV is almost discharged to a point of damaging the battery, such EV may be given priority status to charge among multiple power charging schedules for respective EVs. Also, if an emergency occurred external to the system 200 and energy needs to be supplied to the Grid 10 from the microgrid 202, the controller 240 may determine to delay charging of the EV, such as by modifying an existing power charging schedule of the EV, to maintain the local transformer's load within its capacity.

In one embodiment, the controller 240 may receive EP information from multiple local smart meters and smart controllers of EV charging apparatuses associated with the microgrid 202, and determine power charging schedules for respective EVs at the EV charging apparatuses using alternative power resources, such as DERs, at or associated with respective houses 216 in the power system 200. For example, the charging schedule may be based on a hierarchical aggregation used to implement a Virtual Power Plant (VPP) (i.e., a logical construct that represents a sum of decisions rather than a specific power plan). In this aggregation, transactive energy information related to a Transactive Energy model may be obtained, such that multiple bids from a set of power related devices or systems are collected and merged to determine a market clearing price, and a power charging schedule is determined using the market clearing price for a specified time period of charging.

In another embodiment, EP information from a power consumption device on the microgrid may indicate change of power consumption from a flexible device (i.e., one willing to be flexible with its demand) to a non-flexible device (i.e., one which must charge immediately). For example, a power consumption device, such as an EV, with high priority charging conditions may bid at a very high price to ensure it receives energy at a desired time, based on a request. In this embodiment, the controller 240 may consider such transactive energy information when determining the charging schedule for an EV.

In another embodiment, the controller 240, alone or in combination with the server 270, may serve as an energy aggregation agent that manages multiple agents as energy generation and storage and power consumption devices, and act as a market or auctioneer agent to compute and publish a clearing price, over the communication network 260.

In one embodiment, the controller 240 may determine the power charging schedule from information of availability of one or more charging apparatuses 230 on the microgrid 202, a current queue at the charging apparatus 230, working status of the charging apparatus 230, a discount for charging and other charging related services, and also state of charge of, location of or preferred time for charging the EV.

In one embodiment, the controller 240 may, from the EP information, determine current and anticipated load demand and capabilities, for determining a power charging schedule that provides sufficient power for the EV while avoiding overloading of the microgrid 202.

In one embodiment, a power charging schedule for charging a first EV 255 from the microgrid 202 may be determined based on a change of an existing power charging schedule for charging a second EV 255 from the microgrid 202 to a new power charging schedule. For example, the second EV 255 may be an alternative power resource, such as a DER 218, on the microgrid 202, and the first EV may not be on the microgrid 202 at the time a request for charging the first EV 255 is received. The first EV 255, for example, may not be owned by an owner of any house 216 of the system 200 supplied power from the microgrid 202 and have transmitted a request for charging from any available EV charging apparatus within a predetermined radius of a current location of the first EV, where the current location is external to an area served by the microgrid 202, such as for example 100 miles away from an EV charging apparatus 230 of the system 200.

In block 608, the controller 240 may control transmission of a charging instruction signal for charging an EV 255 from the microgrid 202 based on the charging request therefrom, according to the power charging schedule. In one embodiment, charging instruction signals may be transmitted respectively to one or more of the components of the system 200 on the microgrid 202, and cause the respective controller to perform energy generation or storage, or power consumption, according to the power charging schedule. In one embodiment, the charging instruction signal may include a charging reservation indicating a specific EV charging apparatus 230 on the microgrid 202 at which to charge a specific EV 255 and a time period at which to charge the EV 255 at the EV charging apparatus 230, and respective charging instruction signals may be transmitted for reception by the EV and the specific EV charging apparatus.

In one embodiment, the charging instruction signal may indicate a first time period at which a specific EV, as a combined power consumption and alternative power resource device, is to supply power to the microgrid 202 at a first EV charging apparatus on the microgrid 202, and a second time period at which the specific EV may be charged at a second EV charging apparatus on the microgrid 202, where the first and second EV charging apparatus may be the same or different and the first and second time periods may be the same or different. In a further embodiment, when the second time period is after the first time period according to a power charging schedule, charging instruction signals may be transmitted to provide that power supplied from the EV is stored as energy in the storage system 220 and then power based on the energy stored in the storage system 220 is supplied to the microgrid 202 during the second time period.

In another embodiment, the charging instruction signal may include an instruction for a first EV to supply electric power therefrom to the microgrid 202 at a first time period prior to a second time period indicated for charging of a second EV from the microgrid 202 which had previously requested charging.

In another embodiment, the charging instruction signal may include an instruction for an alternative power resource, such as a Renewable 222, to output power to the microgrid 202 from energy generated therein at a same time when an EV 255 is indicated for charging from the microgrid 202 in a power charging schedule.

In another embodiment, when the power charging schedule is determined based on alternative power resource information indicating a time period for supply of excess available power and an amount of the excess available power for supply from an alternative power resource, such as the storage system 220, to the microgrid 202, the charging instruction signal may provide for charging an EV 255 using excess available power from the storage system 220 at a charging apparatus 230 of the microgrid 202. In a further embodiment, the charging apparatus 230 and the storage system 220 may be included in a same apparatus or directly coupled to each other by electrical wiring other than the wiring 214.

In one embodiment, at block 606, the controller 240 may determine a power charging schedule that matches EV information from a power aggregator, which may be a combination apparatus including a DER, an energy storage system and an EV charging apparatus, with an EV 255. In such embodiment, at block 608 the controller 240 may transmit to the power aggregator, using a desired communication protocol, such as over the Internet or a short range vehicle-to-infrastructure (V2I) communication, as a charging instruction signal, reservations for charging the EV at the charging apparatus of the aggregator.

In block 610, the controller 240 alone or in combination with one or more controllers of components of the system 200 may control charging an EV 255 from the microgrid 202 based on charging instruction signals transmitted. For example, based on the charging instruction signals, the smart meter 214 may be controlled to disconnect the microgrid 202 from the Grid, and then the Renewable 222 may be controlled to supply power to the microgrid 202 at a same time the storage system 220 is controlled to store energy using the power on the microgrid 202. In addition, after a predetermined amount of energy is stored at the system 220, the Renewable 222 may be controlled to no longer supply power to the microgrid 202, and the charging apparatus 230 may be controlled to charge the EV 255 from the microgrid 202 while the storage system 220 is controlled to supply power to the microgrid 202 based on the stored energy therein. Accordingly, the EV 255 may be charged from the microgrid 202 which is disconnected from the Grid 10 based on the charging request, according to the power charging schedule as implemented in the transmitted charging instruction signals.

In one embodiment, the processing performed at the controller 240, according to the technology of this disclosure, may be performed centrally, for example, in a Grid utility operation center, or in a fully or partially decentralized manner. For example, some of the processing may be performed at an EV charging apparatus, a local aggregation device, a controller of a power system where multiple charging apparatus and other local producers and consumers of power are aggregated, a remote server or using several or all the above in a hierarchical power distribution model.

In one embodiment of the hierarchical power distribution model, the processing to determine one or more power charging schedules may be performed at a local aggregation point, e.g., the controller 240 or the BEMS/HEMS controller 250 of a building or parking lot of the microgrid 202, that optimizes local charging of EVs and communicates to a higher layer in a power network forming the Grid 10. The higher layer may be a Distribution System Operator (DSO) which optimizes power delivery over a larger system, using some energy and power related information from local aggregators of the system 200 as well as potentially higher level entities in a power distribution hierarchy, such as a Transmission System Operator (TSO). In this embodiment, the processing to determine the power charging schedule may be performed, for example, both at the local aggregator as well as the DSO and/or the TSO. In one embodiment, when a communication link between a controller serving as a local aggregation point and a controller at an entity which is at a higher level in the power distribution hierarchy is or becomes unavailable, the controller at the local aggregation point advantageously may determine that energy and power related information is no longer available from the higher level entity, and continue to perform processing to determine power charging schedules for a localized region, such a building(s) or parking lot of the microgrid 202 which have multiple EV charging apparatuses, and desirably account for the unavailability of energy and power related information from the higher level entity in determining the power charging schedules.

In one embodiment, in block 604 a request may be for Level 2 charging from an EV and specify the charging rate using default preferences. These preferences may be provided by the EV user though an EV's user interface, a human interface on the charging apparatus 230, through a computer or any number of user or machine-to-machine interfaces. The controller 240 may determine, based on the request and as part of determining a power charging schedule, if the charging apparatus 230 has the capability to service the request and, if not, negotiate with the controller 230A thereof or send a message to the user of the EV inquiring whether another option is acceptable. For example, the negotiation implemented by the controller 240 may include inquiries such as: "Can the charger complete the charge session by the requested time or cost? Does the charger have the primary energy necessary or must it draw from or negotiate with multiple or alternative energy sources? Does the request follow a set of rules established by the owner of the intelligent charging system?" In one embodiment, some of the EP information used in such negotiation may be provided by the smart meter 212.

In an exemplary implementation of the technology of the present disclosure, a power charging schedule for an EV may be determined for the microgrid 202 of the system 200, which is configured to serve the power needs of an area, such as city having curbside parking and smart light poles which have EV charging capabilities. Such municipal charging services may be free or require payment of fee. Based on the limited availability of such EV chargers, the controller 240 may be configured to exchange information with individuals who own and desire to rent charging on a home EV charging apparatus, such as the charging apparatus 230 of a house 216 of the system 200, and determine whether such EV charging apparatuses may be used to fulfill an EV charging request as part of a power charging schedule. The controller 240 may effectively serve as a platform or broker that matches EV owners who desire a charging spot with a private homeowner who may be willing to rent his EV charging apparatus on the microgrid 202, such as during the day when the homeowner is at work. In a further embodiment, the controller 240 may handle billing to provide that a homeowner, as a charging provider, is compensated by an EV user who uses electricity supplied from the homeowner's EV charging apparatus for charging. Advantageously, the power charging schedule determined by the controller 240 may provide for charging of an EV from additional power suppliers for EV charging who provide information as to when and how much power is available.

In one embodiment of the system 200, private homeowners who produce their own energy (using solar, wind, etc.) and have energy storage capabilities may have a surplus that otherwise needs to be discarded, such that the energy is wasted, because supply of the surplus energy as power to the Grid 10 is unavailable or undesired. The controller 240 may instead provide, according to a power charging schedule, that such surplus is sold to EV users at a significantly competitive price, such as below the clearing price, and in one embodiment the controller 240 may determine the electricity supply price based on a market mechanism, such as an auction.

In a further embodiment, a homeowner having a higher voltage power capability charging apparatus may provide EP information to the controller 240 that better (quicker) charging service is available for a premium, and the controller 240 may determine a power charging schedule in accordance with such pricing premium and acceptable preferences for charging indicated in information in a charging request from an EV user.

Advantageously, the controller 240 may use all or parts of many types of the EP information, including preferences and rules and other real time data, to determine a power charging schedule that optimizes charging of an EV, at a selected level, such as Level 2, without overloading the power system 200, and in a way that optimizes choices such as cost, pollution, quality within social and physical limitations of the microgrid 202, and which includes using alternative power resources, such as DERs, Renewables or energy storage system, on the microgrid 202 in a most efficient manner.

In a further embodiment, the controller 240 may, based on EP information, in block 606, perform a prediction power charging scheduling process, when a trigger condition is determined from the EP information, to determine power charging schedules for satisfying future expected power charging requirements from the microgrid 202, using energy which has been previously stored and generated from alternative power resources on the microgrid 202. In such embodiment, it is assumed that the microgrid 202 may be supplied with a predetermined maximum power from the Grid. The EP information, from which the trigger condition is determined, may include alternative power resource information indicating availability of electric power for supply to the microgrid 202 from alternative power resources on the microgrid 202, and condition information indicating current and expected energy storage and power consumption for the microgrid 202. The condition information may include, for example, power consumption condition information indicating current and expect power consumption by power consumption devices including one or more stationary power consumption devices, such as appliances in houses 216, and one or more mobile power consumption devices, such as an apparatus that uses electric energy to cause the EV's wheels to rotate and appliances installed in EVs 255 owned by owners of respective houses 216. In addition, the condition information may desirably include real time information indicating current and expected energy storage at one or more stationary energy storage devices on the microgrid 202, such as Storage 220, and one or more mobile energy storage devices, such as the batteries of the EVs 255 owned by owners respectively of the houses 216. In one embodiment, the condition information may be obtained from EP information acquired from or provided by a social media server or network 280.

The controller 240, based on the condition information, may determine predictive energy storage and power consumption information for the microgrid 202, which includes an estimate of an amount of energy likely to be available for supply from the microgrid 202 and an amount of energy likely to be consumed from the microgrid 202 at a future time.

When the controller 240 determines a trigger condition is present, the controller 240 may perform the prediction power charging scheduling process. The trigger condition may be determined to exist based on, for example, the predictive energy storage and power consumption information. The trigger condition effectively may represent a determination of an anticipated energy shortage for the microgrid 202 during a future time period. In another embodiment, the trigger condition may be determined when the anticipated energy shortage that is determined satisfies a predetermined critical energy shortage condition, or the condition information indicates a predetermined event, such as a change in weather or environment, an anticipated traffic condition or a social event, has occurred or is to occur. In a further embodiment, the trigger condition may be determined using historic driving pattern or population behavior information indicated in the EP information, which may be obtained from information from the server 270 or the server 280.

In one embodiment, the trigger condition may be a set time, such as a periodic time indicated by a time schedule, for example, 10 am on weekdays during the months of July and August where the microgrid 202 is supplied energy from a segment of the Grid 10 which also supplies energy to a major city having a population greater than, for example, one million people. In this embodiment, the trigger condition is set to several hours before an expected time when an energy shortage on the Grid 10, or also the microgrid 202, is likely to exist, such as in the afternoon during weekdays in July and August when energy usage is expected to peak.

In one embodiment, the predictive energy storage and power consumption information may be determined from transaction energy information supplied from the server 270 and indicate a predictive pattern of energy storage and consumption for a predetermined class of energy consumers, a predictive model of operational status of energy equipment, or information indicating an incentive predicted to shift time of energy usage.

In one embodiment, the controller 240 may, by performing the prediction scheduling, determine power charging schedules that may satisfy, based on energy supplied from the microgrid 202, expected power charging requirements of selected power consumption devices, such as appliances including air conditioning units of the houses 216, at a future time period, such as during a weekday in the month of July. For example, the power charging schedules may be determined by the prediction scheduling, based on information indicating a maximum power that is predicted to be available from the Grid and also information which indicates an amount of power that is predicted to be available from the alternative resources 218, 220 and 222 at the future time period.

Further in the embodiment in which there a determination of the trigger condition, as part of block 606, the controller 240 may determine power charging schedules for storing energy generated at, for example, the DER 218 or the Renewable 222, at a time prior to the future time period; power charging schedules for supplying power to the selected appliances at the houses 216 from the microgrid 202 before and during the future time period; and a power charging schedule for charging from the microgrid 202 a battery of one or more EVs 255 during the future time period. In addition, as part of block 608, the controller 240 may control transmitting, over the communication network, charging instruction signals respectively according to each of the power charging schedules determined in block 606.

Also in the embodiment in which there is a determination of the trigger condition, power charging schedules for respective EVs may be determined to satisfy expected power charging requests therefrom for charging from the microgrid 202 at the future time period. In another embodiment, the charging instructions may include directions for charging the EVs respectively at different locations on microgrid 202, such as at different houses 216 containing respective EV charging apparatuses 230, and at different times during the future time period, such as at a first period before, a second time period during, and a third time period after the time or time period of a predetermined event which is indicated by the condition information. In still another embodiment, one or more of the power charging schedules may include price of charging information, where a price of charging for a specific power charging schedule may be based on an indicated time for charging by a charging apparatus 230 on the microgrid 202, or the location of the charging apparatus, such as in relation to a location associated with a predetermined event. The predetermined event may, for example, comprise energy related activities at an office building complex whose energy needs are to be served by the Grid during the future period, where the complex is located near the microgrid 202 and is predicted to have a high energy demand during the future period.

Still further in the embodiment in which there is a determination of the trigger condition, the controller 240 may control transmitting to selected EVs, over the communication network, instruction signals determined according to the power charging schedules that change existing power charging schedules for charging the selected EVs from the microgrid 202 determined before the trigger condition was determined. The instructions signals may indicate a changed power charging schedule that indicates a time for charging a first of the selected EVs from the microgrid 202 at a time different from the future time period, or a time for discharging energy to the microgrid 202 from a second of the selected EVS during the future time period, such that the energy may be supplied, for example, to a third of the selected EVs. In another embodiment, the charging instruction signals may direct the controller of an appliance which is installed at one or more of the houses 216, to decrease power consumption from the microgrid 202 at a predetermined time before or during the future period.

Most of the foregoing alternative examples are not mutually exclusive, but may be implemented in various combinations to achieve unique advantages. As these and other variations and combinations of the features discussed above may be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings may identify the same or similar elements.

The invention claimed is:

1. A method for managing a plurality of electric vehicle (EV) charging apparatuses, the method comprising:
   receiving, over a communication network, social media information from a social media network, wherein the social media information indicates a change in weather;
   determining a plurality of charging schedules for the plurality of EV charging apparatuses based on the social media information;
   transmitting, over the communication network, the plurality of charging schedules to the plurality of EV charging apparatuses; and
   charging a plurality of EVs based on the plurality of charging schedules.

2. The method of claim 1, wherein the social media information includes social media posts.

3. The method of claim 1, wherein the social media information includes social media communication.

4. The method of claim 1, wherein the social media information indicates a future social event.

5. The method of claim 4, wherein the social media information indicates a period of predicted increased energy consumption at a location before the future social event.

6. The method of claim 4, wherein the social media information indicates a period of predicted increased energy consumption at a location during the future social event.

7. The method of claim 4, wherein the social media information indicates a period of predicted increased energy consumption at a location after the future social event.

8. The method of claim 1, wherein the social media information indicates a future energy and power consumption event.

9. The method of claim 1, wherein the social media information indicates a future energy and power generation event.

10. The method of claim 1 further comprising receiving, over the communications network, transactive energy information and the plurality of charging schedules are further determined based on the transactive energy information.

11. The method of claim 10, wherein the transactive energy information is received from a transactive energy market over the communication network.

12. The method of claim 1 further comprising receiving, over the communications network, Internet-of-Things (IoT) information and the plurality of charging schedules are further determined based on the IoT information.

13. The method of claim 12, wherein:
the EV charging apparatuses are located at a plurality of houses; and
the IoT information indicates a probability of an EV user being in bed.

14. The method of claim 1 further comprising receiving, over the communications network, a request for a fast charging session and the plurality of charging schedules are further determined based on the request for the fast charging session.

15. The method of claim 14, wherein the fast charging session is a Level 2 charging session.

16. The method of claim 1, wherein the plurality of charging schedules are further determined based on machine-learning.

17. The method of claim 1 further comprising receiving, over the communications network, transactive energy information, Internet-of-Things (IoT) information, and a request for a fast charging session, wherein: the plurality of charging schedules are further determined based on the transactive energy information, the IoT information, the request for the fast charging session, and machine learning about energy use behavior of a user.

18. A system comprising:
a computing device for managing a plurality of electric vehicle (EV) charging apparatuses, the computing device comprising:
a memory; and
at least one processor configured for:
receiving, over a communication network, social media information from a social media network, wherein the social media information indicates a change in weather;
determining a plurality of charging schedules for the plurality of EV charging apparatuses based on the social media information; and
transmitting, over the communication network, the plurality of charging schedules to the plurality of EV charging apparatuses; and
the plurality of EV charging apparatuses, wherein the plurality of EV charging apparatuses are configured to charge a plurality of EVs based on the plurality of charging schedules.

19. At least one non-transitory computer-readable storage medium storing instructions to be implemented on at least one computing device including at least one processor, the instructions when executed by the at least one processor cause the at least one computing device to perform a method for managing a plurality of electric vehicle (EV) charging apparatuses, the method comprising:
receiving, over a communication network, social media information from a social media network, wherein the social media information indicates a change in weather;
determining a plurality of charging schedules for the plurality of EV charging apparatuses based on the social media information;
transmitting, over the communication network, the plurality of charging schedules to the plurality of EV charging apparatuses; and
charging a plurality of EVs based on the plurality of charging schedules.

20. A method for managing a plurality of electric vehicle (EV) charging apparatuses, the method comprising:
receiving, over a communication network, social media information from a social media network and Internet-of-Things (IoT) information;
determining a plurality of charging schedules for the plurality of EV charging apparatuses based on the social media information and the IoT information;
transmitting, over the communication network, the plurality of charging schedules to the plurality of EV charging apparatuses, wherein:
the EV charging apparatuses are located at a plurality of houses; and
the IoT information indicates a probability of an EV user being in bed; and
charging a plurality of EVs based on the plurality of charging schedules.

21. A system comprising:
a computing device for managing a plurality of electric vehicle (EV) charging apparatuses, the computing device comprising:
a memory; and
at least one processor configured for:
receiving, over a communication network, social media information from a social media network and Internet-of-Things (IoT) information;
determining the plurality of charging schedules for the plurality of EV charging apparatuses based on the social media information and the IoT information; and
transmitting, over the communication network, the plurality of charging schedules to the plurality of EV charging apparatuses, wherein:
the EV charging apparatuses are located at a plurality of houses; and
the IoT information indicates a probability of an EV user being in bed; and
the plurality of EV charging apparatuses configured to charge a plurality of EVs based on the plurality of charging schedules.

22. At least one non-transitory computer-readable storage medium, the non-transitory computer-readable storage medium storing instructions to be implemented on at least one computing device including at least one processor, the instructions when executed by the at least one processor cause the at least one computing device to perform a method for managing a plurality of electric vehicle (EV) charging apparatuses, the method comprising:
receiving, over a communication network, social media information from a social media network and Internet-of-Things (IoT) information;
determining a plurality of charging schedules for the plurality of EV charging apparatuses based on the social media information and the IoT information;

transmitting, over the communication network, the plurality of charging schedules to the plurality of EV charging apparatuses, wherein:
the EV charging apparatuses are located at a plurality of houses; and
the IoT information indicates a probability of an EV user being in bed; and
charging a plurality of EVs based on the plurality of charging schedules.

* * * * *